United States Patent Office 3,433,639
Patented Mar. 18, 1969

3,433,639
PHOTOGRAPHIC EMULSION CONTAINING A BLOCK POLYMER SENSITIZED WITH SAPONIN
Charles Allen Goffe, Brockport, N.Y., assignor to Eastman Kodak Company, Rochester, N.Y., a corporation of New Jersey
No Drawing. Filed Nov. 7, 1966, Ser. No. 596,043
Continuation-in-part of application Ser. No. 331,141, Dec. 17, 1963. This application Nov. 7, 1966, Ser. No. 596,043
U.S. Cl. 96—107        9 Claims
Int. Cl. G03c 1/28

This is a continuation in part of my copending application Ser. No. 331,141, filed Dec. 17, 1963, now U.S. Patent No. 3,294,540.

This invention relates to photography and particularly to "lith-type" photographic silver halide emulsions and to improved photographic elements comprising such emulsions.

"Lith-type" photographic silver halide emulsions are fine-grain, high-contrast silver halide emulsions, predominantly silver chloride, usually containing at least 60 mole percent silver chloride and less than 40 mole percent silver bromide and less than 5 mole percent silver iodide. These emulsions are used mostly in graphic arts for making halftone or line images and are preferably developed by pure hydroquinone photographic developer solutions having very low sulfite concentration in alkaline solution to produce the best high contrast and high dot quality for halftone reproduction.

In my copending application, Ser. No. 331,141, filed Dec. 17, 1963, now U.S. Patent No. 3,294,540, I have described improved photographic elements comprising a "lith-type" emulsion layer and containing a water-soluble block polymer of polyoxypropylene and polyoxyethylene in the emulsion layer or in a colloid layer contiguous to the emulsion layer.

Elements containing these block copolymers offer several advantages including improved photographic speed control, better dot quality, fewer development defects, better resistance to sulfite-containing developers, etc.

The water-soluble block polymers of polyoxypropylene and polyoxyethylene useful in accordance with the present invention are those that have an average molecular weight between 800–3,000 with the polyoxyethylene unit constituting from about 10–70 percent by weight of the polymers. These polymers may be represented by the formula (I)        $Y[(C_3H_6O)_n—E—R]_x$ wherein Y represents an organic radical having a valence of $x$, said radical being the residue of an organic compound containing atoms selected from the group consisting of carbon, hydrogen, oxygen, nitrogen, and sulfur with $x$ active hydrogen atoms such as the residue of polyhydroxy compounds, e.g. ethylene glycol, 1,2-propanediol, 1,5-pentanediol, 1,2,3-propanetriol, sucrose, etc., the residue of a polybasic acid, e.g., oxalic acid, malonic acid, succinic acid, maleic acid, citric acid, etc., the residue of a polyamine, e.g., ethylenediamine, 1,3-diaminopropylene, ets., the residue of a polyamide, e.g., malonamide, succinamide, etc., the residue of a polythiol, e.g., 1,2-ethylenedithiol, 1,3-propylenedithiol, etc.; $n$ is an integer greater than 1; $x$ is an integer greater than 1, so that the values of $n$ and $x$ are such that the molecular weight of the said polymer exclusive of Y, E and R is between 800 and 3,000; E represents a polyoxyethylene chain constituting from about 10 to about 70 percent by weight of said block polymer; and R represents the hydrogen atom, an alkyl group having from 1 to 20 carbon atoms (such at methyl, propyl, decyl, dodecyl, octadecyl, etc.), an alkyl carbonyl group in which the alkyl group has from 1 to 20 carbon atoms as described above, an aryl carbonyl group, such as, benzoyl, p-methyl benzoyl, etc.

Included among the preferred block polymers are those having the formula:

(II) 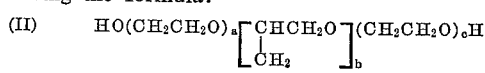

in which $b$ represents an integer of from 14 to 52; $a$ and $c$ are each integers such that the sum of $a+c$ has a total of from 4 to 48 and the polyoxyethylene groups constitute between 10 and 70 percent by weight of the block polymer.

The block polymers of Formula II and of Formula I where R represents the hydrogen atom are described in Lundsted U.S. Patent 2,674,619, issued April 6, 1954 and Lundsted U.S. Patent 3,022,335, issued Feb. 20, 1962. The block polymers of Formula I in which R is hydrogen are readily converted to compounds where R represents an organic residue by reaction with the appropriate reagent in a suitable inert organic solvent that is preferably anhydrous. For example, alkyl halides, such as alkyl chlorides, alkyl bromides, etc., are used to advantage to replace the terminal hydrogen atom of the block polymer with an alkyl group. Alkyl-p-toluenesulfonates are also used to advantage to place an alkyl group on the end of the block polymers. The appropriate acid chloride or acid anhydride, such as, acetyl chloride, propionyl chloride, stearoyl chloride, benzoyl chloride, acetic anhydride, etc., are used to advantage to prepare block polymers of Formula I in which R is an alkyl carbonyl or an aryl carbonyl group. These reactions are well known to those skilled in the art. Many of the block polymers of Formulas I and II are available commercially.

An object of the present invention is to provide improved photographic elements of the kind described in by copending application, Ser. No. 331,141, now U.S. Patent No. 3,294,540, with the further improvement that photographic speed of the silver halide emulsion is substantially increased by means of saponin added in layer containing said block polymer. I have found that addition of saponin to a "lith-type" silver halide emulsion containing a polypropylene-polyethylene oxide block copolymer results in a large increase in photographic speed without loss of other beneficial effects obtained with the block polymers of this type. This unexpected speed increase appears to be a synergistic effect peculiar to the combination of saponin with these particular block copolymers. Addition of saponin to an emulsion containing no polymer of this type produced no speed increase. Addition of saponin to an emulsion that was similar but contained a simple polyethylene glycol polymer instead of the block polymer, produced relatively much less speed increase. Although saponin is a known additive for improving the coatability of gelatin silver halide photographic emulsions, its ability to increase speed in combination with these block polymers was entirely unexpected.

The invention will be better understood by reference to the following example which describes in detail a most preferred mode of carrying out the invention and illustrating specific examples embodying the invention.

EXAMPLE

A silver chlorobromoiodide emulsion was prepared containing approximately 90 mole percent chloride, 9 mole percent bromide, and 1 mole percent iodide. The emulsion contained 450 mg. of gelatin per 455 mg. of silver. To separate portions of the emulsion were added a polymer or saponin or both in varying proportions as shown in Table 1. Each emulsion was then coated on a polyethylene terephthalate film support having a suitable subbing at a coverage of 455 mg. silver and 450 mg. gelatin per square foot and dried. Each coating was then exposed on a density scale sensitometer and processed in a developer of the composition described in Example 1 of my U.S. application Ser. No. 331,141, supra, for 3¾ minutes, then fixed, washed, and dried. Results of the photographic tests are shown in Table 1 for each of the samples made and tested.

TABLE 1

| Coating No. | Polymer | Mg. polymer/ Ag mole | Gm. Saponin/ Ag mole | Rel. speed | γ | Fog |
|---|---|---|---|---|---|---|
| 1 | None | | None | 100 | 2.6 | .01 |
| 2 | do | | 5.1 | 89 | 2.8 | .01 |
| 3 | do | | 10.2 | 100 | 2.6 | .01 |
| 4 | PEO* | 130 | None | 100 | 12.8 | .01 |
| 5 | PEO* | 130 | 5.1 | 115 | 11.0 | .01 |
| 6 | PEO* | 130 | 10.2 | 141 | 10.0 | .01 |
| | Pluronic | | | | | |
| 7 | L64 | 35 | None | 100 | 6.6 | .01 |
| 8 | L64 | 35 | 5.1 | 436 | 12.2 | .01 |
| 9 | L64 | 35 | 10.2 | 436 | 12.0 | .01 |

*PEO = oleyl ether of polyethylene oxide, M.W. = 1,540.

Pluronic L64 is a commercial trade name for a block polymer of the kind described above containing about 40 percent by weight polyoxyethylene and containing block polyoxypropylene units containing an average of about 30 monomeric units in each block and containing a radical corresponding to Y in the formula above derived from 1,2-propanediol. The oleyl ether polyethylene oxide was tested for comparative results.

The water-soluble block polymers, which are useful according to the present invention in "lith-type" silver halide emulsions in combination with saponin, are described in greater detail in my copending application Ser. No. 331,141 filed Dec. 17, 1963 and which is incorporated herein by reference, in its entirety.

Saponin present in amounts ranging from about 2 gm. to about 30 gm./per mole silver will be effective in combination with the block polymer present in amounts ranging from about 1 mg. to about 1 gram per mole silver in most embodiments. However, we do not intend to unnecessarily limit the invention to these particular concentrations but rather to include within the invention all combinations of saponin and a block polymer of the class defined in photographic emulsions exhibiting the synergistic speed increase I have discovered.

Saponin is effective with any of the class of block polymers of polyoxyethylene and polyoxypropylene which are described above and which are described in more detail in the parent application. The synergistic combination is also effective to increase speed as described in emulsions which are sensitized with various chemical sensitizers or with various spectral sensitizers and in emulsions to which are added other addenda such as ammonium salts, sulfonium salts, phosphonium salts, and the like, other hydrophilic colloids such as hydrophilic vinyl polymers, various incorporated developers such as 3-pyrazolidone developers, etc. I have not found a photographic emulsion comprising the synergistic combination in which the synergistic combination is not effective to increase speed.

The present invention includes photographic elements in which the synergistic combination of block polymer and saponin are in a hydrophilic colloid layer separate from but adjacent to a silver halide emulsion layer so that the layer containing the block polymer is contiguous to the silver halide emulsion layer.

Photographic elements according to the present invention may comprise any suitable support, for example, any suitable glass, film, or paper support, and the like including such supports comprising layers functional as adhesive subbings, antistatic coatings, barrier layers, incorporated developer layers, baryta, polyolefin coatings, etc. Particularly, for lithographic uses I would select a support especially suited for lithography such as a polyethylene terephthalate film support with suitable subbing.

For the emulsion layer and other hydrophilic layers of photographic elements in accordance with this invention, I may select any suitable hydrophilic colloid binder, such as gelatin and other natural and synthetic hydrophilic colloids and the like. The binder can comprise a hydrophilic colloid such as gelatin and a dispersed vinyl polymer such as an alkyl acrylate or methacrylate.

In will be understood that modifications and variations may be made within the scope of the invention as described above and as defined in the following claims.

I claim:

1. In a light-sensitive photographic element comprising a support coated with at least one hydrophilic colloid layer containing a silver halide emulsion in which the halide comprises at least 60 mole percent chloride and at least one hydrophilic colloid layer containing a water soluble block polymer consisting essentially of polyoxypropylene units and polyoxyethylene units in which the polyoxypropylene units have an average molecular weight of between 800–3,000 and the polyoxyethylene units constitute from about 10–70 percent by weight of said polymer, such that the said block polymer is contiguous to the said silver halide; the improvement wherein saponin is present in the hydrophilic colloid layer containing said water soluble block polymer in an amount sufficient to substantially increase photographic speed of said silver halide emulsion over the speed of said emulsion without presence of saponin.

2. A photographic element defined by claim 1 wherein said water soluble block polymer and said saponin are present together in a photosensitive silver halide emulsion layer of the element.

3. A photographic element defined by claim 1 wherein said saponin is present in an amount ranging from about 2 to about 30 gms. per mole silver and said block copolymer is present in an amount in the range from about 1 mg. to about 1 g. per mole silver in the photographic element.

4. The improved photographic element defined by claim 1 wherein said block polymer has the formula $$Y[(C_3H_6O)_n\text{—}E\text{—}R]_x$$

wherein Y represents an organic radical having a valence of X; $n$ is an integer; $x$ is an integer greater than 1, so that the values of $n$ and $x$ are such that the molecular weight of the said polymer exclusive of Y, E and R is between 800 and 3,000; E represents a polyoxyethylene chain constituting from about 10 to about 70 percent by weight of said polymer; and R is a member selected from the class consisting of the hydrogen atom, an alkyl group, an alkyl carbonyl group, and an aryl carbonyl group.

5. The improved photographic element defined by claim 1 wherein said block polymer has the formula:

$$HO(CH_2CH_2O)_a\left[\begin{array}{c}CHCH_2O\\|\\CH_3\end{array}\right]_b(CH_2CH_2O)_cH$$

wherein $b$ represents an integer of from 14 to 52; and $a$ and $c$ each represent integers such that the sum of $a+c$ represents an integer of from 4 to 48 and the polyoxethylene groups constitute between 10 and 70 percent by weight of said polymer.

6. A photographic silver halide emulsion comprising a hydrophilic colloid binder, photosensitive silver halide which comprises at least 60 mole percent silver chloride, a water soluble block polymer consisting essentially of polyoxypropylene units and polyoxyethylene units in which the polyoxypropylene units have an average molecular weight of between 800 and 3,000 and polyoxyethylene units constitute from about 10 percent to about 70 percent of said block polymer, and saponin in an amount sufficient to substantially increase photographic speed of said emulsion over the speed of said emulsion without saponin.

7. A photographic silver halide emulsion defined by claim 6 wherein saponin is present in an amount ranging from about 2 to about 30 gm. per mole silver and said block copolymer is present in an amount in the range from 1 mg. to about 1 gram per mole silver in the photographic element.

8. A photographic silver halide emulsion defined by claim 6 wherein said block polymer has the formula $$Y[(C_3H_6O)_n\text{—}E\text{—}R]_x$$

wherein Y represents an organic radical having a valence of X; $n$ is an integer; $x$ is an integer greater than 1, so that the values of $n$ and $x$ are such that the molecular weight of the said polymer exclusive of Y, E and R is between 800 and 3,000; E represents a polyoxyethylene chain constituting from about 10 to about 70 percent by weight of said polymer; and R is a member selected from the class consisting of the hydrogen atom, an alkyl group, an alkyl carbonyl group, and an aryl carbonyl group.

9. A photographic silver halide emulsion defined by claim 6 wherein said block polymer has the formula:

$$HO(CH_2CH_2O)_a\left[\begin{array}{c}CHCH_2O\\|\\CH_3\end{array}\right]_b(CH_2CH_2O)_cH$$

wherein $b$ represents an integer of from 14 to 52; and $a$ and $c$ each represent integers such that the sum of $a+c$ represents an integer of from 4 to 48 and the polyoxyethylene groups constitute between 10 and 70 percent by weight of said polymer.

References Cited
UNITED STATES PATENTS

| | | | |
|---|---|---|---|
| 3,018,178 | 1/1962 | Harriman | 96—94 |
| 3,294,540 | 12/1966 | Goffe | 96—87 |

NORMAN G. TORCHIN, *Primary Examiner.*

R. E. FICHTER, *Assistant Examiner.*